United States Patent
Kim et al.

(10) Patent No.: US 10,182,451 B2
(45) Date of Patent: Jan. 15, 2019

(54) METHOD AND APPARATUS FOR REQUESTING SCHEDULING IN CELLULAR MOBILE COMMUNICATION SYSTEM

(71) Applicant: Samsung Electronics Co., Ltd., Gyeonggi-do (KR)

(72) Inventors: Youngbum Kim, Seoul (KR); Younsun Kim, Gyeonggi-do (KR); Juho Lee, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/908,039

(22) PCT Filed: Aug. 11, 2014

(86) PCT No.: PCT/KR2014/007441
§ 371 (c)(1),
(2) Date: Jan. 27, 2016

(87) PCT Pub. No.: WO2015/020501
PCT Pub. Date: Feb. 12, 2015

(65) Prior Publication Data
US 2016/0192386 A1     Jun. 30, 2016

(30) Foreign Application Priority Data
Aug. 9, 2013  (KR) ..................... 10-2013-0094471

(51) Int. Cl.
*H04W 72/12*        (2009.01)
*H04W 52/36*        (2009.01)
(Continued)

(52) U.S. Cl.
CPC ....... *H04W 72/1268* (2013.01); *H04L 1/1812* (2013.01); *H04L 5/0055* (2013.01);
(Continued)

(58) Field of Classification Search
CPC .................................................. H04W 72/1268
See application file for complete search history.

(56) References Cited

U.S. PATENT DOCUMENTS 8,422,387 B2   4/2013   Hsu
8,743,814 B2   6/2014   Kim
(Continued)

FOREIGN PATENT DOCUMENTS

CN       101938841       1/2011
EP       2 426 860       3/2012
(Continued)

OTHER PUBLICATIONS

PCT/ISA/237 Written Opinion issued on PCT/KR2014/007441 (pp. 6).
(Continued)

*Primary Examiner* — John D Blanton
(74) *Attorney, Agent, or Firm* — The Farrell Law Firm, P.C.

(57) ABSTRACT

The present invention relates to a method for a terminal requesting scheduling to transmit uplink data in a mobile communication system. More specifically, the present invention, in a system that aggregates carriers between different base stations, defines a process and a method for scheduling requests so that a terminal can transmit "scheduling request" control information to each base station, thereby enabling effective transmission of dynamic scheduling and uplink data.

22 Claims, 13 Drawing Sheets

(51) Int. Cl.
  *H04L 1/18* (2006.01)
  *H04L 5/00* (2006.01)
  *H04W 72/04* (2009.01)

(52) U.S. Cl.
  CPC ..... *H04W 52/365* (2013.01); *H04W 72/0453* (2013.01); *H04W 72/1284* (2013.01); *H04W 72/1289* (2013.01); *H04W 72/1231* (2013.01)

(56) References Cited

U.S. PATENT DOCUMENTS

| | | | |
|---|---|---|---|
| 2009/0081946 A1* | 3/2009 | Dankberg | H04B 7/18543 455/3.02 |
| 2011/0269393 A1 | 11/2011 | Ostergaard et al. | |
| 2012/0039278 A1* | 2/2012 | Park | H04W 72/1278 370/329 |
| 2012/0113914 A1 | 5/2012 | Zhao et al. | |
| 2013/0021929 A1* | 1/2013 | Kim | H04B 7/024 370/252 |
| 2013/0115966 A1 | 5/2013 | Kang et al. | |
| 2013/0201966 A1 | 8/2013 | Weng et al. | |
| 2014/0161086 A1 | 6/2014 | Tamura et al. | |
| 2015/0071260 A1* | 3/2015 | Chun | H04L 1/1848 370/336 |
| 2015/0208448 A1* | 7/2015 | Fu | H04W 8/26 370/329 |
| 2015/0230235 A1* | 8/2015 | Uchino | H04W 28/14 370/329 |
| 2017/0208584 A1* | 7/2017 | Qu | H04W 72/0413 |

FOREIGN PATENT DOCUMENTS

| | | |
|---|---|---|
| KR | 1020110039160 | 4/2011 |
| WO | WO 2012/011704 | 1/2012 |
| WO | WO 2013/179590 | 12/2013 |

OTHER PUBLICATIONS

PCT/ISA/210 Search Report issued on PCT/KR2014/007441 (pp. 3).
European Search Report dated Mar. 2, 2017 issued in counterpart application No. 14834010.2-1857, 9 pages.
Alcatel-Lucent et al., "MAC and PHY Modifications Required for Dual Connectivity Support", R2-131964, 3GPP TSG-RAN WG2 Meeting #82, May 20-24, 2013, 4 pages.
HTC, "Considerations on UE Trigger RACH Procedure", R2-114522, 3GPP TSG-RAN WG2 Meeting #75, Aug. 22-26, 2011, 3 pages.
LG Electronics Inc., "Limit Endless SR Transmission", R2-083436, 3GPP TSG-RAN WG2 #62bis, Jun. 30-Jul. 4, 2008, 2 pages.
Japanese Office Action dated Aug. 27, 2018 issued in counterpart application No. 2016-533254, 11 pages.
Chinese Office Action dated Aug. 27, 2018 issued in counterpart application No. 201480044083.2, 27 pages.

* cited by examiner

METHOD AND APPARATUS FOR REQUESTING SCHEDULING IN CELLULAR MOBILE COMMUNICATION SYSTEM

TECHNICAL FIELD

The present invention relates to cellular wireless communication systems, and more particularly, to a scheduling request transmitting method and apparatus for a terminal (user equipment) to transmit uplink data to a base station (eNB) in a communication system that supports carrier aggregation among base stations.

BACKGROUND ART

Wireless communication systems that were providing voice-based services have evolved to broadband wireless communication systems that are capable of providing packet data services based on high quality and high speed, such as: Long Term Evolution (LTE), High Speed Packet Access (HSPA) defined in 3GPP; Ultra Mobile Broadband (UMB), High Rate Packet Data (HRPD) defined 3GPP2; the communication standard IEEE 802.16e; etc.

The LTE system, as a typical example of the broadband wireless communication systems, employs Orthogonal Frequency Division Multiplexing (OFDM) in the downlink and Single Carrier-Frequency Division Multiple Access (SC-FDMA) in the uplink. The Multiple Access performs allocation and management of time-frequency resources to carry data and control information according to users, so as not to overlap each other, i.e., so as to achieve orthogonality between them, thereby distinguishing data or control information between respective users.

The LTE system employs a Hybrid Automatic Repeat reQuest (HARQ) scheme for retransmitting data, which has failed in decoding in the initial transmission, via the physical layer. HARQ is a scheme that allows a receiver to transmit, when not correctly decoding data from a transmitter, information (NACK) indicating the decoding failure to the transmitter so that the transmitter can perform re-transmission of the data from the physical layer. The receiver combines the data re-transmitted from the transmitter with the existing data for which decoding has failed, thereby increasing the capability of data reception. When correctly decoding data, the receiver transmits information (ACK) indicating the success of decoding to the transmitter so that the transmitter can perform transmission of new data.

In broadband wireless communication systems, one of the important factors in providing high transmission rate wireless data services is the ability to support scalable bandwidths. For example, LTE systems are capable of supporting various bandwidths, such as 20/15/10/5/3/1.4 MHz, etc. Therefore, service providers are capable of selecting a particular one of the various bandwidths and providing services via the bandwidth. There are various types of user equipment (UE) devices that are capable of supporting bandwidths from a minimum of 1.4 MHz to a maximum of 20 MHz.

LTE-Advanced (LTE-A) systems, aiming to provide a level of service for IMT-Advanced requirements, are capable of providing services in broadband up to the maximum of 100 MHz, by aggregating LTE carriers. LTE-A systems require to be wider than that of LTE systems for high-speed data transmission. In addition, LTE-A systems need to allow for the backward compatibility with LTE user equipment (UE) devices, so that the LTE UE devices can access the services of the LTE-A systems. To do this, LTE-A systems divide the whole system bandwidth into sub-bands or component carriers (CC), through which LTE UE devices are capable of transmission or reception, and aggregate part of the component carriers. LTE-A systems are capable of creating data according to respective component carriers and performing transmission of the created data. LTE-A systems are capable of high speed data transmission in the transmission/reception processes of the legacy LTE systems used according to the respective component carriers.

FIG. 1 shows a schematic diagram of a conventional LTE-A system capable of carrier aggregation. As shown in FIG. 1, eNB102 supports the aggregation of two component carriers, CC#1 and CC#2. CC#1 has a frequency f1 and CC#2 has a frequency f2 that differs from f1. CC#1 and CC#2 are equipped with the same base station (eNB102). The eNB102 provides coverages 104 and 106 corresponding to the component carriers CC#1 and CC#2 respectively. The LTE-A system capable of carrier aggregation performs transmission of data and transmission of control information related to the data transmission according to component carriers respectively. The configuration shown in FIG. 1 may be applied to the aggregation of uplink carriers the same way as the aggregation of downlink carriers.

The carrier aggregation system divides component carriers into Primary Cell (Pcell) and Secondary Cell (Scell) to manage them. Pcell refers to a cell that provides the basic radio resources to UE and serves as a standard cell allowing UE to perform operations such as the initial access, a handover, etc. Pcell includes a downlink primary frequency or Primary Component Carrier (PCC) and an uplink primary frequency. Scell refers to a cell that provides additional radio resources to UE along with Pcell. Scell includes a downlink secondary frequency or Secondary Component Carrier (SCC) and an uplink secondary frequency. In the present disclosure, unless otherwise indicated, the terms 'cell' and 'component carrier' will be used interchangeably with each other.

Conventional LTE-A systems capable of carrier aggregation had a restriction that they need to perform carrier aggregation within the same eNB.

In recent years, carrier aggregation between different eNBs has been discussed. When performing carrier aggregation between different eNBs, there is a need to clearly define a method for UE to request scheduling for the uplink data transmission.

DISCLOSURE OF INVENTION

Technical Problem

The present invention has been made in view of the above problems, and provides a method and apparatus for requesting scheduling for a terminal (user equipment) to perform transmission of uplink data in a mobile communication system.

The present invention further provides a method and procedure for a terminal (user equipment) to request scheduling in a system performing carrier aggregation between different eNBs.

Solution to Problem

In accordance with an embodiment of the present invention, the present invention provides a method for a terminal to transmit scheduling request (SR) information in a wireless communication system that supports carrier aggregation among at least two or more base stations, comprising:

receiving information related to transmission of SR information from the base station; when needing to transmit uplink data, determining a destination base station to which the SR information is transmitted, based on a preset standard; and transmitting the SR information to the determined, destination base station.

In accordance with another embodiment of the present invention, the present invention provides a method for a terminal to transmit scheduling request (SR) information in a wireless communication system that supports carrier aggregation among at least two or more base stations, comprising: receiving information regarding resources for transmission of SR control information for respective, carrier-aggregated base stations, from a base station; when needing to transmit uplink data, determining a destination base station to which the SR information is transmitted, based on a preset standard; and transmitting the SR information to the determined, destination base station, via the resources corresponding to the determined, destination base station.

In accordance with another embodiment of the present invention, the present invention provides a method for a terminal to control transmission power in a wireless communication system that supports carrier aggregation among at least two or more base stations including first and second base stations, comprising: determining the base station to transmit scheduling request (SR) control information to the first base station and uplink control information to the second base station; deciding whether the total amount of transmission power of signals to be transmitted the first and second base stations exceeds the maximum available transmission power of a terminal; when the total amount of transmission power exceeds the maximum available transmission power, determining the priority of transmission from among the SR control information and the uplink control information, according to types of the uplink control information; and transmitting the SR control information or the uplink control information to the first or second base station, according to the determined priority.

In accordance with another embodiment of the present invention, the present invention provides a terminal for transmitting scheduling request (SR) information in a wireless communication system that supports carrier aggregation among at least two or more base stations, comprising: a transceiver for transmitting/receiving signals to/from the base stations; and a control unit for: receiving information related to transmission of SR information from the base station; determining, when needing to transmit uplink data, a destination base station to which the SR information is transmitted, based on a preset standard; and transmitting the SR information to the determined, destination base station.

In accordance with another embodiment of the present invention, the present invention provides a base station for transmitting scheduling control information in a wireless communication system that supports carrier aggregation among at least two or more base stations, comprising: a transceiver for transmitting/receiving signals a terminal or an adjacent base station; a control unit for: transmitting information related to transmission of scheduling request (SR) information to the terminal; receiving SR information from the terminal; creating scheduling control information in response to the SR information; and transmitting, to the terminal, the created scheduling control information via a downlink frequency of the base station or downlink frequencies of the remaining carrier-aggregated base stations.

Advantageous Effects of Invention

As described above, the present invention defines a procedure and method for requesting scheduling in the wireless communication system, thereby enabling the terminal (user equipment) to efficiently transmit uplink data.

MODE FOR THE INVENTION

Embodiments of the present invention are described in detail with reference to the accompanying drawings. Detailed descriptions of well-known functions and structures incorporated herein may be omitted to avoid obscuring the subject matter of the invention. The terms or words described in the following description should not be limited by a general or lexical meaning, instead should be analyzed as a meaning and a concept through which the inventor defines and describes the invention to the best of his/her ability, to comply with the idea of the invention. The term 'base station' refers to an entity for allocating resources to terminal (or user equipment) and is capable of being implemented with at least one of the following: eNode B, eNB, Node B, Base Station (BS), a wireless access unit, a base station controller, a node of the network, etc.

The 'term' terminal is capable of including User Equipment (UE), Mobile Station (MS), a cellular phone, a smart phone, a computer, or a multimedia system capable of communication. Although the following disclosure describes an E-UTRA (or called LTE) or Advanced E-UTRA (or called LTE-A), it should be understood that the present invention can also be applied to other communication systems that have similar technical backgrounds and/or channel forms. It will be also appreciated to those skilled in the art that the embodiments may be modified and the modifications may also be applied to other communication systems, without departing from the scope of the present invention.

The present invention defines a method for requesting scheduling for a terminal (user equipment) to perform transmission of uplink data in an LTE-A system that configures a broad bandwidth through carrier aggregation between different base stations.

Figure 2:
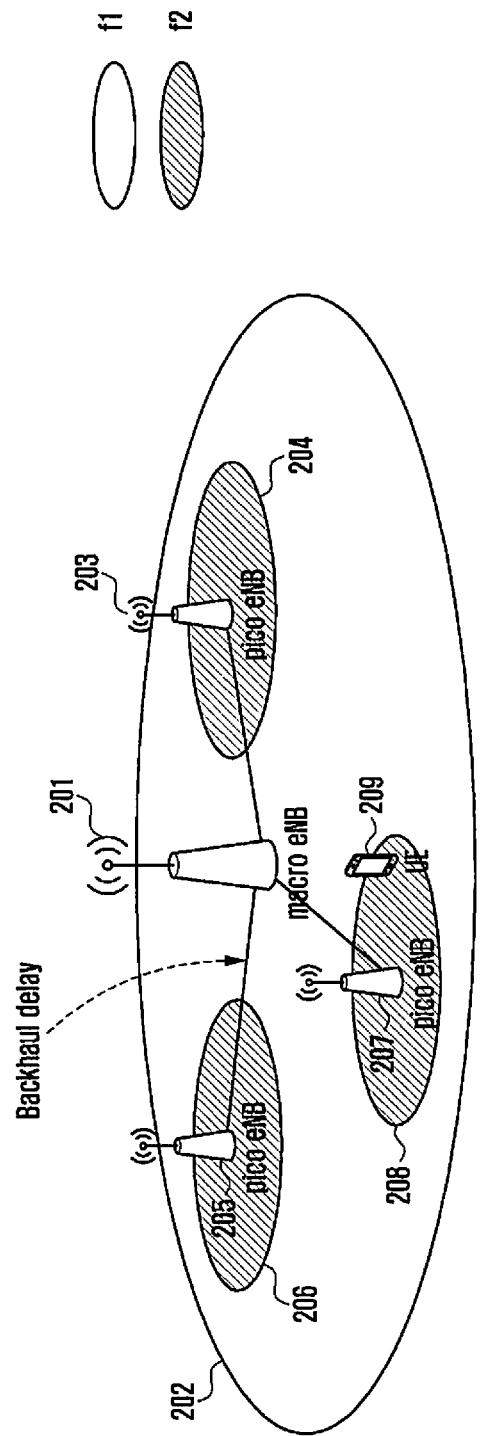
FIG. 2 shows a schematic diagram of an LTE-A system configuring a broadband via carrier aggregation between different eNBs.

Referring to FIG. 2, a description is provided regarding an LTE-A system configuring a broadband via carrier aggregation between different base stations.

FIG. 2 shows the LTE-A system where a macro eNB 201 having the coverage 202 is located and small eNB, e.g., pico eNBs 203, 205 and 207 having coverages 204, 206 and 208, respectively, are located within the coverage 202. In general, a macro eNB is capable of transmitting signals at a higher transmission power than the pico eNBs, and has also a larger coverage than each of the pico eNBs.

The macro eNB 201 is connected to pico eNBs 203, 204 and 205, with a certain amount of backhaul delay. Therefore, it is preferred not to exchange delay-sensitive information between macro and pico eNB.

Although the embodiment shown in FIG. 2 describes the carrier aggregation between a macro eNB and pico eNBs, it should be understood that the present invention is not limited thereto but may also be applied to carrier aggregation between geographically remote eNBs, e.g., between macro eNBs geographically located at different places, between pico eNBs geographically located at different places, etc. In addition, the present invention has no limit in the number of carriers to be aggregated.

In the embodiment shown in FIG. 2, it is assumed that the macro eNB and pico eNB use frequency f1 and frequency f2 for transmission of downlink signals, respectively. The macro eNB transmits data or control information to user equipment (UE) 209 via frequency f1. The pico eNB transmits data or controller information to UE 209 via frequency f2. As such various eNBs are capable of transmitting signals to UE simultaneously, via different frequencies, through carrier aggregation, thereby enhancing the maximum data rate and the system throughput.

The configuration of FIG. 2 is also capable of being applied to uplink carrier aggregation as well as downlink carrier aggregation. For example, UE is capable of transmitting data or control information to the macro eNB via frequency f1' for uplink signal transmission. UE is also capable of transmitting data or control information to the pico eNB via frequency f2' for uplink signal transmission. Frequency f1' may be defined as it corresponds to frequency f1. Frequency f2' may be defined as it corresponds to frequency f2.

When UE needs to transmit uplink data to an eNB via Physical Uplink Shared Channel (PUSCH), it establishes Physical Uplink Control Channel (PUCCH) and transmits control information 'scheduling request (SR)' to the eNB, thereby requesting to schedule the uplink data.

Figure 1:
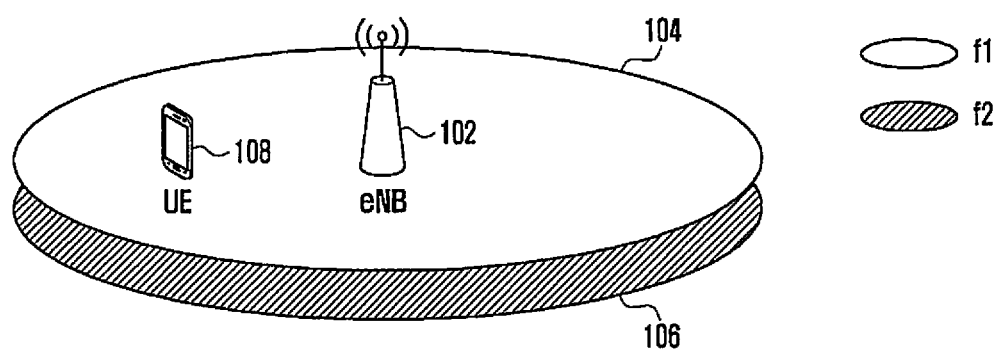
FIG. 1 shows a schematic diagram of a conventional LTE-A system capable of carrier aggregation according to a conventional art.

The system performing carrier aggregation within the same eNB shown in FIG. 1 is operated in such a way that: UE transmits control information 'scheduling request (SR)' for uplink data transmission via one pre-fixed uplink component carrier (e.g., Pcell); and the eNB that received the 'SR' control information determines to schedule uplink data transmission of UE via one from among the carrier-aggregated uplink component carriers and establishes Physical Downlink Control Channel PDCCH) to transmit the scheduling information to the UE. As the number of uplink component carrier to transmit the SR control information is fixed to one, the transmission of the SR control information can be consistently performed, regardless of a condition as to whether to support the uplink carrier aggregation of UE.

Unlike the system of FIG. 1, the system performing carrier aggregation between different eNBs shown in FIG. 2 is operated in such a way that: when the uplink component carrier transmitting the SR control information is restricted to one pre-fixed uplink component carrier, the eNB that received the SR control information is restricted to determining whether to schedule on only the uplink component carrier that the eNB is managing. This restriction is because eNBs have schedulers respectively, and there is a certain amount of backhaul delay between eNBs. That is, in order for an eNB that received the SR control information to notify another eNB of the SR condition for the UE, it takes a period of time corresponding to the backhaul delay. Therefore, the dynamic scheduling is impossible and this decreases the system efficiency.

In order to resolve the problems, the present invention provides a specific procedure for UE to transmit scheduling request (SR) control information to respective eNBs in a system performing carrier aggregation between the eNBs.

Figure 3:
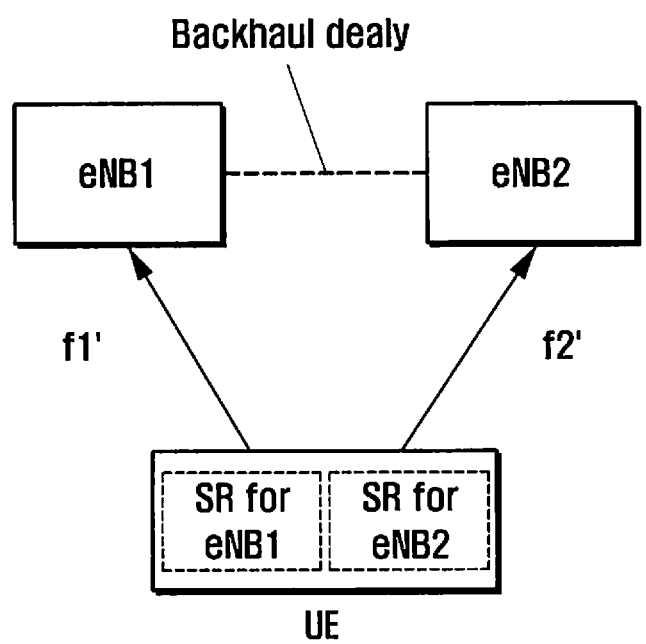
FIG. 3 is a schematic diagram showing the concept that UE transmits 'scheduling request' control information to respective eNBs in a system allowing for carrier aggregation between different eNBs according to a first embodiment.

FIG. 3 is a schematic diagram showing the concept that UE transmits 'scheduling request' control information to respective eNBs according to a first embodiment. In the embodiment shown in FIG. 3, it is assumed that the system performs carrier aggregation between different eNBs as in the embodiment FIG. 2.

As shown in FIG. 3, when UE needs to transmit uplink data via one of the uplink frequencies controlled by a first eNB, it transmits the SR control information via frequency f1' corresponding to the uplink frequency of the first eNB. Likewise, when UE needs to transmit uplink data via one of the uplink frequencies controlled by a second eNB, it transmits the SR control information via frequency f2' corresponding to the uplink frequency of the second eNB.

That is, the embodiment according to the present invention allows UE to transmit the SR control information to respective eNBs corresponding to uplink frequencies through which the UE needs to transmit the uplink data. Meanwhile, conventional UE transmits the SR control information to eNBs via one pre-fixed uplink component carrier.

The following description provides a detailed explanation regarding a method of transmitting scheduling request (SR) control information according to an embodiment of the present invention.

<First Embodiment>

In a first embodiment of the present invention, a description is provided regarding a method for UE to transmit scheduling request (SR) control information in a system performing carrier aggregation between eNBs 1 and 2 that differ from each other.

It is assumed that eNB1 operates on a downlink frequency f1 and an uplink frequency f1' and eNB 2 operates on a downlink frequency f2 and an uplink frequency f2'. It is also assumed that UE receives downlink signals from eNB1 and eNB2 via frequencies f1 and f2 respectively and UE transmits uplink signals to eNB1 and eNB2 via frequencies f1' and f2' respectively.

Figure 4:
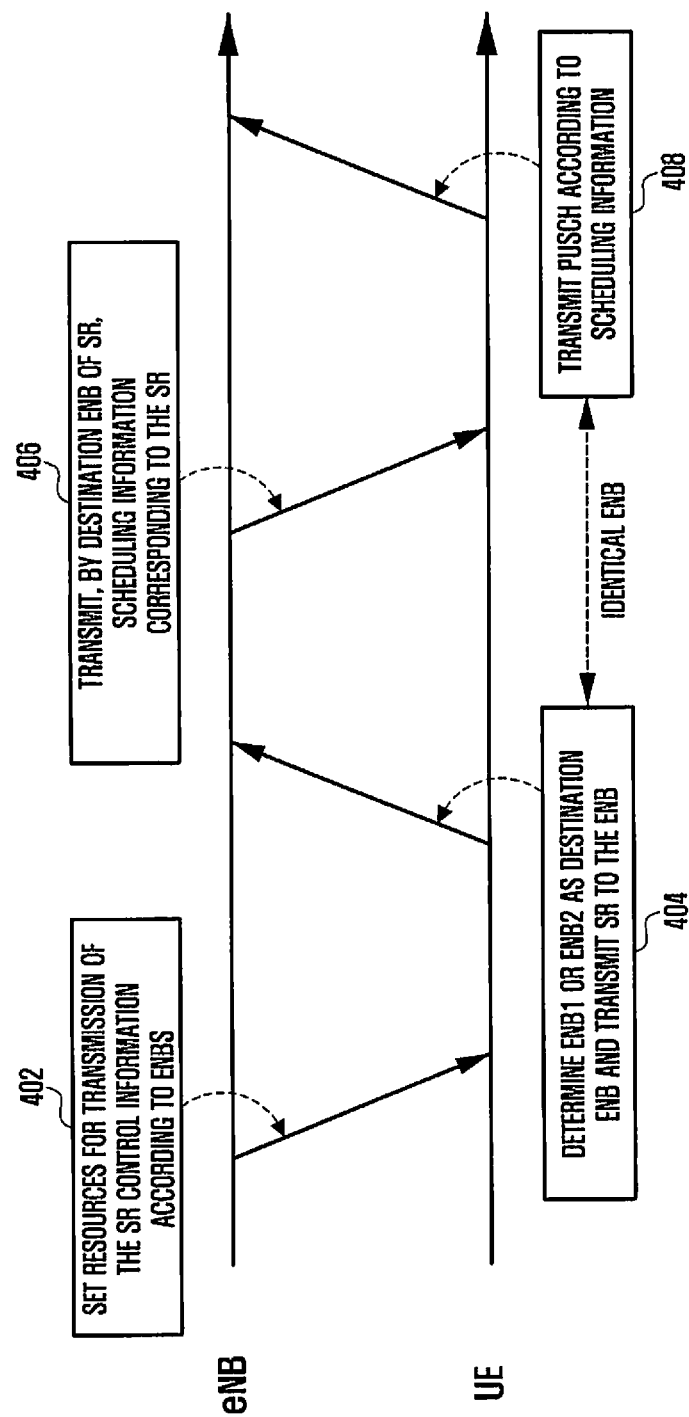
FIG. 4 is a flow diagram showing the transmission and reception processes between an eNB and UE according to a first embodiment.
Figure 5:
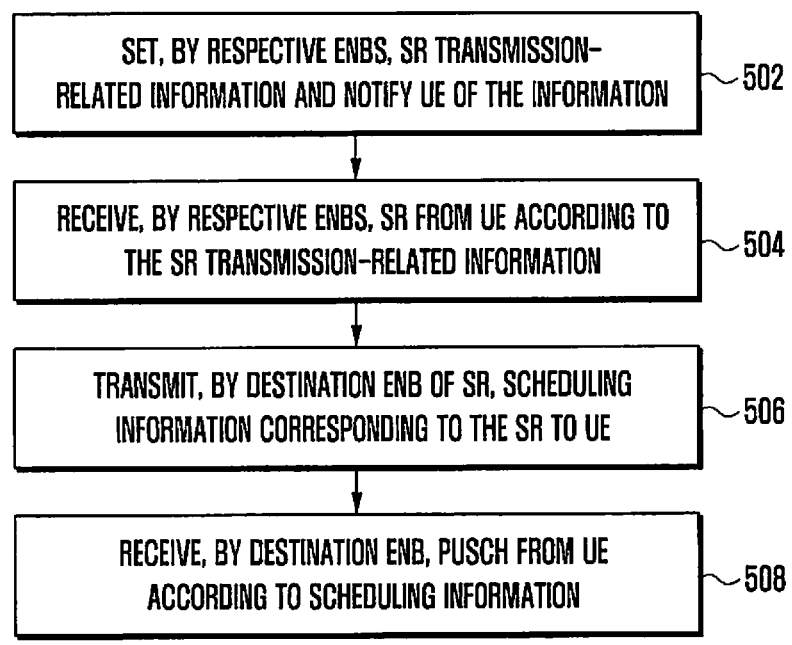
FIG. 5 is a flow diagram showing the procedure of an eNB according to a first embodiment.

Referring to FIG. 4, a description is provided regarding the transmission and reception processes between an eNB and UE according to a first embodiment. The operation procedure of the eNB corresponding to FIG. 4 is shown in FIG. 5. The operation procedure of the UE corresponding to FIG. 4 is shown in FIG. 6.

The respective eNB1 and eNB2 set resources for transmission of the scheduling request (SR) control information of UE in operation 402 of FIG. 4, and notify the UE of the setup information in operation 502 of FIG. 5. According to an embodiment, the information regarding resources for transmission of the SR control information is notified to the UE by the upper layer signaling, e.g., Radio Resource Control (RRC) signaling.

The resources for transmission of the SR control information include a transmission period of the SR control information, a timing offset within the transmission period of the SR control information, the resource index of the SR control information, etc. Time points that the respective eNBs set resources for transmission of the SR control information and notify UE of the setup information may differ from each other.

Figure 6:
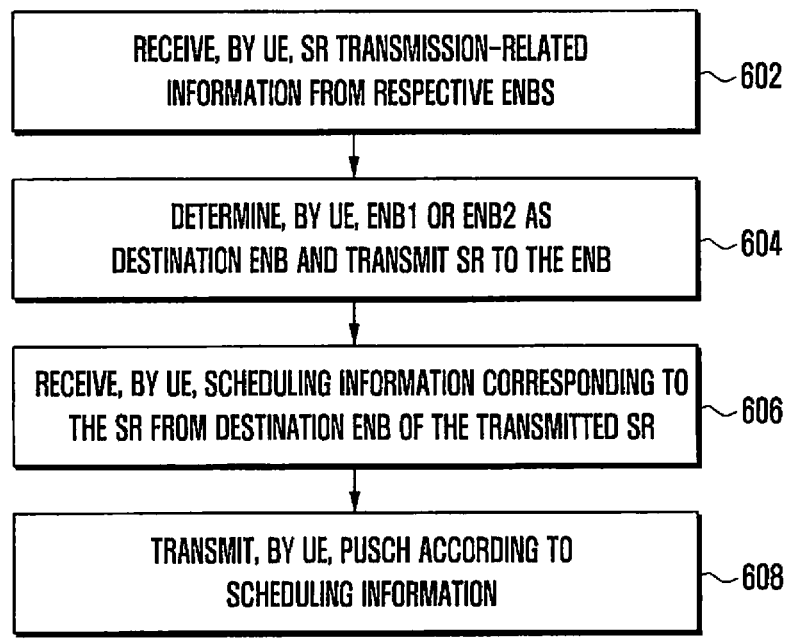
FIG. 6 is a flow diagram showing the procedure of UE according to a first embodiment.

The UE receives, from the respective eNBs, information related to resources for transmission of the SR control information in operation 602 of FIG. 6. When uplink data needs to be transmitted, the UE determines eNB1 or eNB2 as a destination eNB based on a preset standard in operation 404 of FIG. 4. The UE transmits the SR control information to the destination eNB in operation 604 of FIG. 6.

The UE determines the destination eNB, considering: a type of data to be transmitted, a channel state between UE and each of the eNBs, a power headroom indicating available power by UE, a condition as to whether a cell-configuring carrier aggregation is activated, etc. For example, when UE needs to transmit voice data, it is capable of determining a macro eNB as a destination eNB to guarantee the mobility. UE is capable of determining an eNB having a relatively high level of channel status as a destination eNB. UE is capable of determining a cell that has relatively large power headroom of UE or an eNB configuring the cell as a destination eNB. UE is capable of determining a destination eNB from among the eNBs including activated cells, excluding inactivated cells.

Through an uplink frequency of a destination eNB determined by the UE, according to the resources for transmission of the SR control information preset and notified to the UE by corresponding eNB, the UE configures the SR control information as PUCCH, and transmits the configuration. Therefore, the SR control information may not explicitly include an eNB identifier as separate information. However, it may be implicitly exposed which an eNB UE requests scheduling from via the uplink, from the uplink frequency through which the SR control information is transmitted.

Although the embodiment is described in such a way that the SR control information transmitted by the UE may not explicitly include the corresponding eNB identifier, it should be understood that the present invention is not limited to the embodiment. The embodiment may be modified in such a way that SR control information may be configured to include a corresponding eNB identifier and transmitted to the eNB.

The eNB1 or eNB2 determines whether to receive (or to make an attempt to receive) the SR control information transmitted from the UE via the respective uplink frequencies f1' and f2', according to the resources for transmission of the SR control information preset to the UE, in operation 504 of FIG. 5.

When the UE determines eNB1 as a destination eNB and transmits the SR control information to the eNB1 in operation 404, the eNB1 receives the SR control information from the UE. However, the eNB2 does not receive the SR control information from the UE.

When the destination eNB successfully received the SR control information from the UE, it determines whether it schedules the uplink according to the received SR control information in operation 406.

When the destination eNB ascertains that it has scheduled uplink data to the UE, it configures the SR control information as PDCCH and transmits the information to the UE via the downlink frequency corresponding to the destination eNB in operation 506 of FIG. 5. The SR control information includes resource allocation information, modulation scheme, uplink power control information, etc., which are required for the UE to transmit the uplink data.

The UE that transmitted the SR control information to the destination eNB makes an attempt to receive the SR control information for the uplink data that the UE needs to transmit, via the downlink frequency corresponding to the destination eNB, for a certain period of time from a time point that the SR control information was transmitted, in operation 606 of FIG. 6. The period of time may be preset by the eNB and then notified to the UE. The period of time may also be defined as a fixed value.

When the UE successfully received the SR control information from the destination eNB, it configures the uplink data as PUSCH and transmits the PUSCH according to the SR control information in operation 408 of FIG. 4 and operation 608 of FIG. 6.

On the other hand, when the UE does not receive the SR control information from the destination eNB within the period of time, it performs a random access procedure to request scheduling from the destination eNB once more or, with ascertaining that the destination eNB is impossible to perform schedule, transmits the SR control information to the other eNB, not the destination eNB, thereby requesting scheduling.

The destination eNB to which the UE transmits PUSCH in operation 408 is the same as the destination eNB to which the UE transmitted the SR control information in operation 404. For example, when the UE determines eNB1 as a destination eNB and transmits the SR control information thereto in operation 404, the eNB1 performs scheduling to the corresponding uplink and the UE transmits PUSCH to the eNB1 as a destination eNB, according to the scheduling of the eNB1.

The eNB that transmitted scheduling information in operation 406 makes an attempt to receive PUSCH transmitted from the UE according to the scheduling information in operation 508 of FIG. 5.

Although the embodiment is described in such a way that eNB1 operates on one downlink frequency f1 and one uplink frequency f1' and eNB2 operates on one downlink frequency f2 and one uplink frequency f2', it may be modified in such a way that each of the eNB operates on a plurality of uplink frequencies/a plurality of downlink frequencies.

For example, it may be implemented in such a way that eNB1 operates on a plurality of downlink frequencies f1 and f2 and a plurality of uplink frequency f1' and f2' and eNB2 operates on a plurality of downlink frequencies f3 and f4 and a plurality of uplink frequency f3' and f4'. In this case, each of the eNB1 and eNB2 allocates one or more resources for transmission of scheduling request (RS) control information to the coverage and operates them. In addition, the respective eNBs inform UE of available uplink frequencies for transmission of the corresponding SR control information in the coverages, by signaling, or preset uplink frequencies for transmission of the corresponding SR control information in the coverages.

It should be understood that the first embodiment may be modified in various fashions. In the following description, for the sake of convenience, the method of the first embodiment is called 'method 1' and a method modified from the first embodiment is called 'method 2.' Referring to FIG. 7, the transmission and reception processes between an eNB and UE according to 'method 2' is described.

Figure 7:
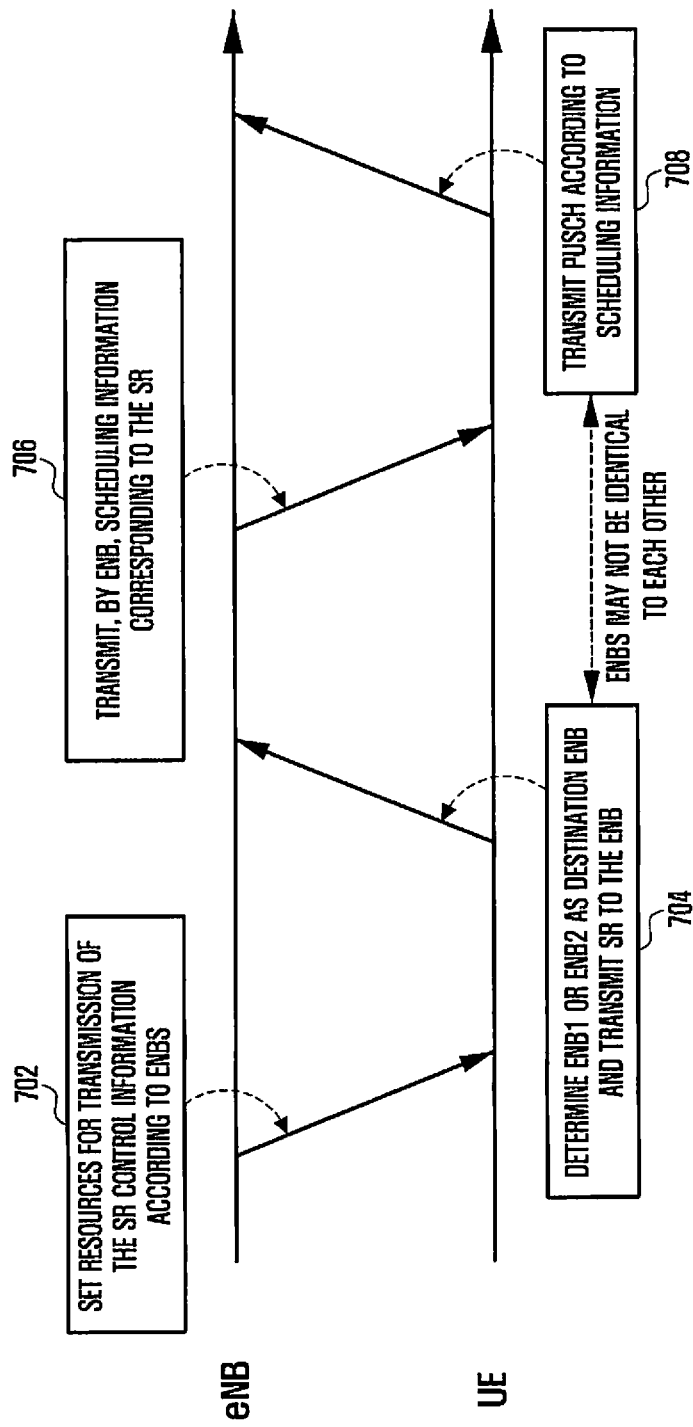
FIG. 7 is a flow diagram showing the transmission and reception processes between an eNB and UE according to 'method 2' of a first embodiment.
Figure 8:
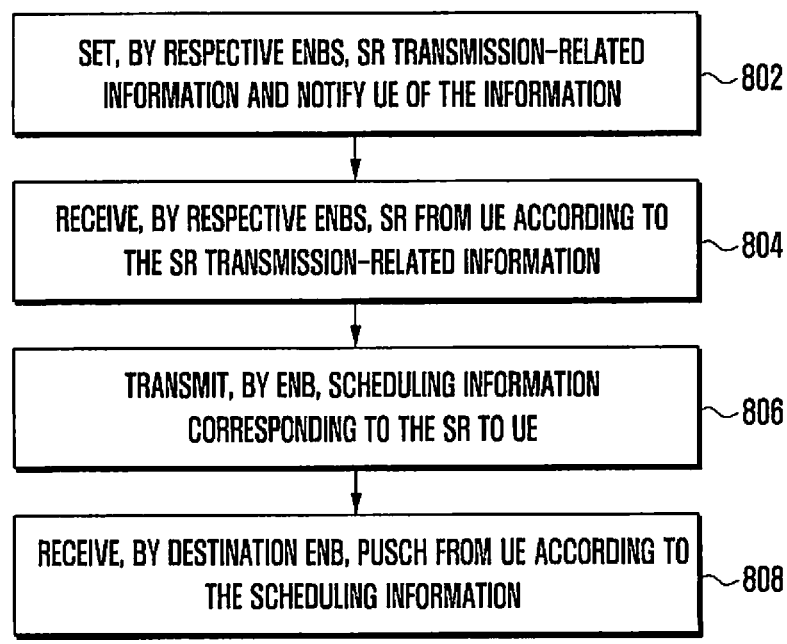
FIG. 8 is a flow diagram showing the procedure of an eNB according to 'method 2' of a first embodiment.

FIG. 7 is a flow diagram showing the transmission and reception processes between an eNB and UE according to 'method 2' of a first embodiment. The operation procedure of the eNB corresponding to FIG. 7 is shown in FIG. 8. The operation procedure of the UE corresponding to FIG. 7 is shown in FIG. 9.

For the sake of convenience, the following description will leave out the detailed explanation regarding the same parts as in FIGS. 4, 5 and 6. Unlike operation 406 of method 1, method 2 of the present invention allows eNB1 or eNB2 to transmit the scheduling information corresponding to the scheduling request (SR) control information of UE in operation 706 of FIG. 7, or operation 806 of FIG. 8. This is because the amount of backhaul delay between eNB1 and eNB2 is not large. This is useful for a case where information can be dynamically exchanged between eNBs. Therefore, eNB1 or eNB2 forwards the SR control information received from the UE to the other eNB, thereby enabling the other eNB to use the information for the scheduling determination.

eNB1 or eNB2 that determined the scheduling for uplink data to the UE configures the SR control information as PDCCh and transmits the PDCCh to the UE via the downlink frequency corresponding to a corresponding eNB.

Figure 9:
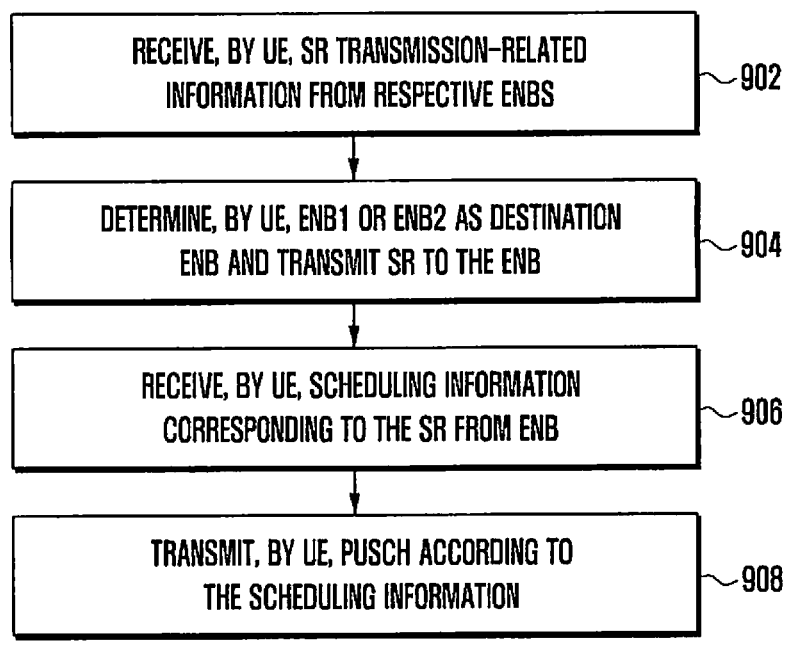
FIG. 9 is a flow diagram showing the procedure of UE according to 'method 2' of a first embodiment.

The UE that transmitted the SR control information makes an attempt to receive the scheduling control information for the uplink data that the UE needs to transmit, via the downlink frequency corresponding to eNB1 or eNB2, for a certain period of time from a time point that the SR control information was transmitted, in operation 906 of FIG. 9.

When the UE successfully received the scheduling control information from eNB1 or eNB2, it configures the uplink data as PUSCH and transmits the PUSCH according to corresponding scheduling control information in operation 708 of FIG. 7. In this case, the destination eNB to which the UE transmits PUSCH may differ from the destination eNB to which the UE transmits the SR control information.

According to the embodiment of the present invention, the eNB determines whether to use method 1 or method 2 and notifies the UE of the determination by signaling, thereby providing a procedure for requesting scheduling suitable for configuration of a system. The notification signaling may be the upper layer signal, e.g., Radio Resource Control (RRC) signaling.

For example, when the backhaul delay between eNBs is relatively large, method 1 may be used. When the backhaul delay between eNBs is so small that the eNB can dynamically exchange the control information with each other, method 2 may be used.

On the other hand, when the UE does not receive the scheduling control information from the eNB within the period of time in operation 906, additional operations may be defined as follows:

Operation 1: UE is previously assigned a period of time to be commonly applied to eNB1 and eNB2. When the UE does not receive scheduling control information from any of the eNBs within the period of time from a time point that the SR control information was transmitted, it performs a random access procedure to request scheduling from the destination eNB once more or, with ascertaining that the destination eNB is impossible to perform schedule, transmits the SR control information to the other eNB, not the destination eNB, thereby requesting scheduling.

Operation 2: UE is previously assigned a period of time applied to eNB1; a period of time to be applied to eNB2; and the priority indicating which eNB the UE first makes an attempt to receive scheduling control information from. When the UE does not receive scheduling control information from an eNB with a higher priority, within a period of time corresponding to the eNB, from a time point that the SR control information was transmitted, it makes an attempt to receive scheduling control information from the other eNBs, for the period of time corresponding to the eNB. When the UE does not receive scheduling control information from the other eNBs, for the period of time corresponding to the eNB, either, it performs a random access procedure to request scheduling from the eNB with a higher priority.

<Second Embodiment>

Figure 10:
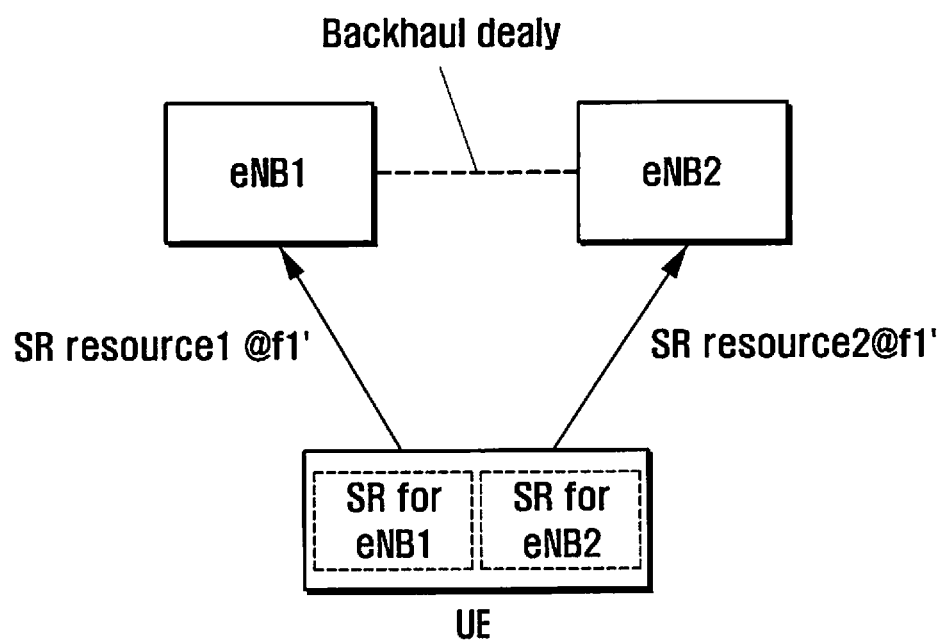
FIG. 10 is a schematic diagram showing the concept that UE transmits 'scheduling request' control information to respective eNBs in a system where different eNBs are connected to each, according to a second embodiment.

In a second embodiment, referring to FIG. 10, a description is provided regarding a method for UE to transmit scheduling request (SR) control information in a system where eNBs 1 and 2 that differ from each other are connected.

FIG. 10 is a schematic diagram showing the concept of a second embodiment.

As shown in FIG. 10, it is assumed that eNB1 and eNB 2 commonly operate on a downlink frequency f1 and an uplink frequency f1'. It is also assumed that UE receives downlink signals from the respective eNB1 and eNB2 via the frequency f1, and transmits uplink signals to the respective eNB1 and eNB2 via the frequency f1'.

Unlike the first embodiment, the second embodiment has a feature that UE uses the same uplink frequency to transmit the SR control information, regardless of a destination eNB. With the feature, the configuration of the second embodiment is capable of using method 1 and method 2 described above in the first embodiment. In particular, in order to distinguish between destination eNBs, the second embodiment sets resources for transmission of the SR control information according to the eNBs to be distinguished from each other. That is, at least one of the factors, configuring the resources for transmission of the SR control information: a transmission period of the SR control information, a timing offset within the transmission period of the SR control information, and the resource index of the SR control information, is set to other value to be distinguished between eNBs.

To this end, the respective eNBs are capable of transmitting, to UE, information regarding resources for transmission of the SR control information in order for the UE to distinguish between destination eNBs. In this case, after eNB1 receives information regarding the resources from eNB2, eNB1 and eNB2 may transmit, to the UE, information regarding resources for transmission of the SR control information for both of the eNBs or the respective eNB1 and eNB2 may transmit, to the UE, information regarding resources for transmission of the SR control information for the each of the individual eNBs, respectively. The information regarding resources for transmission of the SR control information is described as an example. The respective eNBs may set their own using values and inform UE of the values.

When UE needs to transmit uplink data, it determines a destination eNB to transmit the SR control information, based on a preset standard. The UE may transmit the SR control information via the resources corresponding to the destination eNB.

As described above, since resources for transmission of the SR control information are distinguished from each other according to respective eNBs, although the same carrier-aggregated frequency is used between the eNBs, the individual eNBs are each capable of detecting the SR control information being requested.

<Third Embodiment>

The third embodiment of the present invention describes operations for the case where, when UE simultaneously transmits SR control information to eNB1 and uplink control information or data to eNB2 at an arbitrary time, the total amount of transmission power for signals to be transmitted exceeds the maximum available transmission power of the UE.

A case where UE simultaneously transmits SR control information to eNB1 and control information indicating a channel status, Channel Status Indicator (CSI), to eNB2, at an arbitrary time: since CSI has a feature to be periodically transmitted and may thus be restored at the next CSI transmission time, UE prioritizes the transmission of SR control information. That is, UE transmits SR control information to eNB1. UE reduces transmission power of CSI control information to less than a required level so that the total amount of transmission power for signals to be transmitted does not exceed the maximum available transmission power of the UE and transmits SCI control information to eNB 2 or does not transmit CSI control information. Resources for transmission of SR control information and resources for transmission of CSI control information are assigned to UE by eNB1 and eNB2 respectively.

A case where UE simultaneously transmits SR control information to eNB1 and HARQ ACK/NACK control information to eNB2, at an arbitrary time: since HARQ ACK/NACK fails and this decreases the system efficiency, transmission of HARQ ACK/NACK is prioritized. That is, UE transmits ACK/NACK to eNB2. UE reduces transmission power of SR control information to less than a required level so that the total amount of transmission power for signals to be transmitted does not exceed the maximum available transmission power of the UE and transmits SR control information to eNB 2 or does not transmit SR control information. Resources for transmission of SR control information and resources for transmission of HARQ ACK/NACK control information are assigned to UE by eNB1 and eNB2 respectively.

A case where UE simultaneously transmits SR control information to eNB1 and Sounding Reference Signal (SRS) for measuring the uplink channel to eNB2, at an arbitrary time: since SRS has a feature to be periodically transmitted and may thus be restored at the next SRS transmission time, UE prioritizes the transmission of SR control information. That is, UE transmits SR control information to eNB1. UE reduces transmission power of SRS to less than a required level so that the total amount of transmission power for signals to be transmitted does not exceed the maximum available transmission power of the UE and transmits SRS to eNB 2 or does not transmit SRS. Resources for transmission of SR control information and resources for transmission of SRS are assigned to UE by eNB1 and eNB2 respectively. In addition, another method may be defined referring to the procedure shown in FIG. 11.

Figure 11:
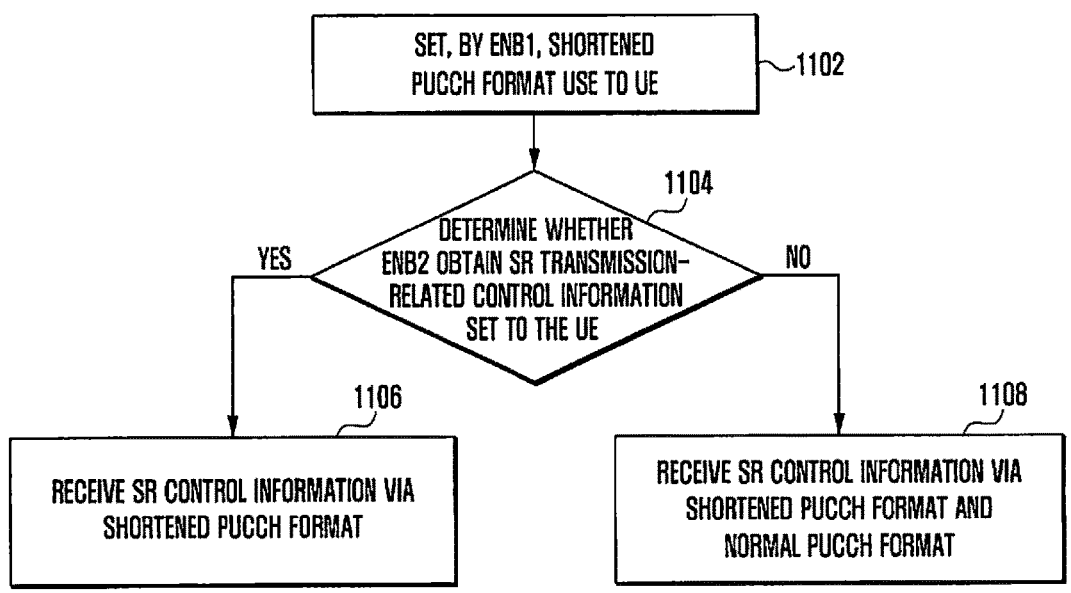
FIG. 11 is a flow diagram showing operations of an eNB when a time point that UE transmits 'scheduling request' control information and a transmission time point of SRS overlaps, according to a third embodiment.

FIG. 11 is a flow diagram showing a method for eNB1 to receive scheduling request (SR) control information when a sub-frame capable of transmitting SR control information that UE transmits to eNB1 is identical to a sub-frame capable of transmitting SRS that UE transmits to eNB2. When eNB1 sets a sub-frame such as a SRS transmission sub-frame so that UE uses a shortened PUCCH format as a PUCCH format (in operation 1102), the UE transmits SRS to eNB2 and SR control information to eNB1, in the shortened PUCCH format. The shortened PUCCH format is configured so as not to transmit the last symbol of the normal PUCCH format, and thus serves to transmit SRS to the last symbol position. Therefore, eNB1 and eNB2 detect, commonly, by inter-eNB signaling: SRS transmission-related control information including a time point that SR control information can be transmitted; and SR transmission-related control information including a time point that SR control information can be transmitted, where the time points are set to the UE by the opposite eNB of the eNB1 and eNB2, (in operation 1104). Therefore, eNB1 is capable of determining whether UE transmits the SR control information, in the current sub-frame, in the shortened PUCCH format (in operation 1106). When there is no signaling between eNBs, eNB1 cannot detect a time point that UE transmits SRS to eNB2. Therefore, the UE needs to attempt at detecting PUCCH formats for both of the shortened PUCCH format and normal PUCCH format at a time point that the UE can transmit the SR control information to eNB1 (in operation 1108).

A case where UE simultaneously transmits SR control information to eNB1 and eNB2 at an arbitrary time: UE transmits voice data to a macro eNB to guarantee the mobility, and UE is previously assigned a semi-persistent scheduling scheme (SPS) for resources related to the transmission of voice data from eNB. Data, not voice data sensitive to transmission delay, is transmitted to a pico eNB defined as the relative distance between UE and eNB is close, thereby achieving high speed data transmission. Therefore, the priority of the SR control information transmitted to a macro eNB is reduced to be less than that of the SR control information transmitted to a pico eNB. That is, UE transmits SR control information for a pico eNB to the pico eNB. UE reduces transmission power of SR control information for a macro eNB to less than a required level so that the total amount of transmission power for signals to be transmitted does not exceed the maximum available transmission power of the UE and transmits the SR control information to the macro eNB or does not transmit the SR control information. When eNB1 and eNB2 are the same type of eNB, i.e., both are a macro eNB or a pico eNB, the priority is previously set to transmit the SR control information to whichever one of the eNBs is first and the UE is informed of the setting via signaling.

A case where UE simultaneously transmits SR control information to eNB1 and PUSCH to eNB2 at an arbitrary time: as a first method, eNB1 or eNB2 notifies UE, by signaling, to ask a condition as to whether the UE can perform simultaneous transmission of PUSCH and PUCCH at any time. When the UE is allowed to perform simultaneous transmission of PUSCH and PUCCH by signaling, it prioritizes the transmission of SR control information. That is, UE transmits the SR control information to eNB1. UE reduces transmission power of PUSCH to less than a required level so that the total amount of transmission power for signals to be transmitted does not exceed the maximum available transmission power of the UE and transmits PUSCH to eNB 2 or does not transmit PUSCH. This is because PUSCH uses HARQ and thus the error may thus be corrected via the re-transmission. Resources for transmission of SR control information and resources for transmission of PUSCH are assigned to UE by eNB1 and eNB2 respectively. On the other hand, when UE is not allowed to perform simultaneous transmission of PUSCH and PUCCH, the UE transmits the SR control information to eNB1 and does not transmit PUSCH. The eNB1 and eNB2 notifies each other by mutual eNB signaling of a condition as to whether to allow the UE to perform the simultaneous transmission of PUSCH and PUCCH, thereby recognizing the common UE operations. As a second method, the eNB does not perform an additional signaling operation for a condition as to whether to allow the UE to perform simultaneous transmission of PUSCH and PUCCH. The second method determines that the UE is capable of simultaneous transmission of PUSCH and PUCCH, and performs the same operations as the case of the first method where the UE is allowed to perform simultaneous transmission of PUSCH and PUCCH by signaling.

Figure 12:
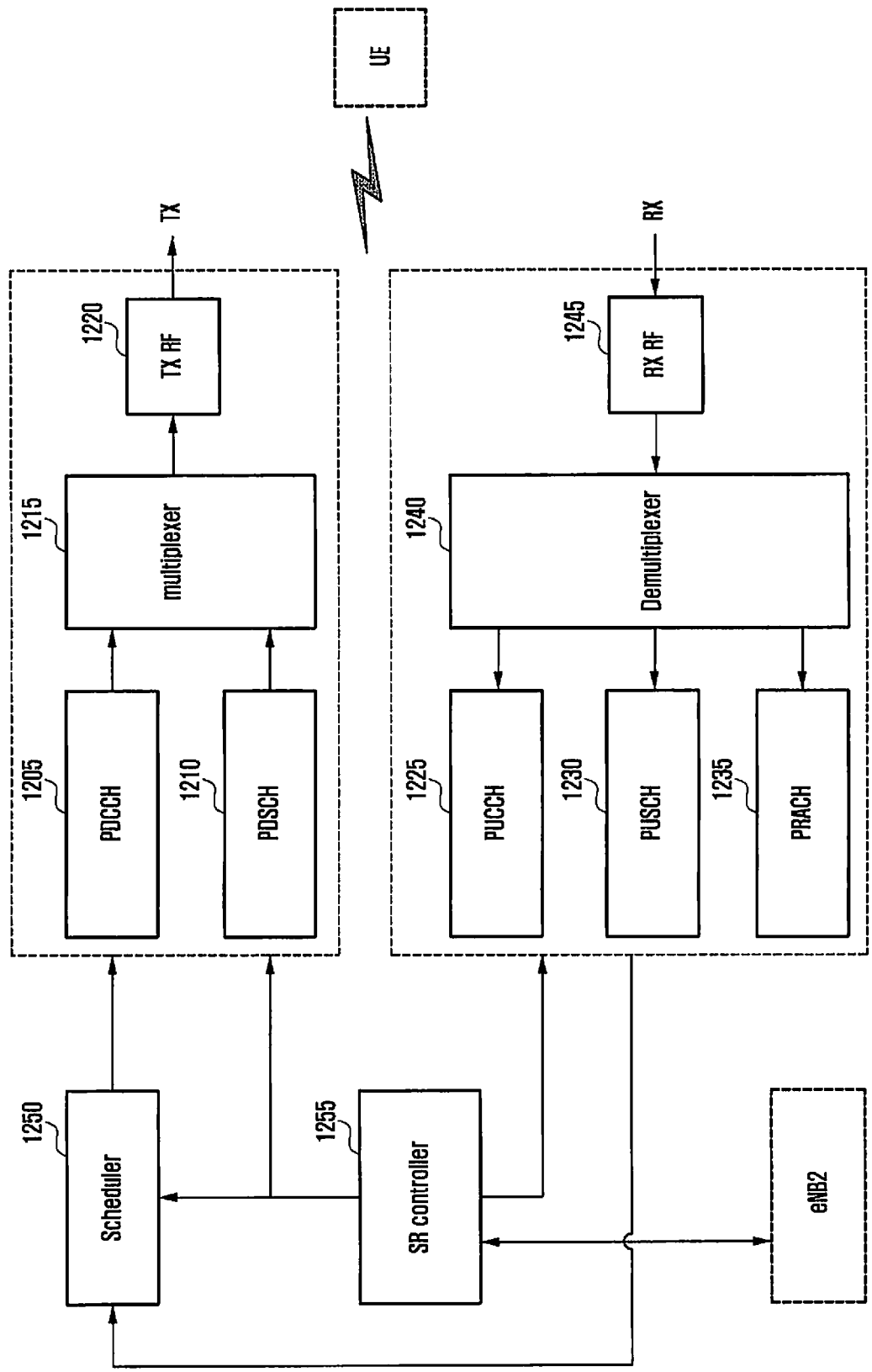
FIG. 12 is a schematic block diagram showing an eNB according to an embodiment of the present invention.

FIG. 12 is a schematic block diagram showing eNB1 according to an embodiment of the present invention. For the sake of convenience, parts of the eNB, not directly related to the present invention, will be left out of the following description and the drawing.

Referring to FIG. 12, the eNB1 includes a transmitter, a receiver, a scheduling request (SR) controller 1255 and a scheduler 12150. The transmitter includes a PDCCH block 1205, PDSCH block 1210, multiplexer 1215, and transmission RF (TX RF) block 1220. The receiver includes a PUCCH block 1225, PUSCH block 1230, PRACH block 1235, demultiplexer 1240, and reception RF (RX RF) block 1245. In the embodiment, the SR controller and the scheduler may also be called a control unit as a commonly called name.

The SR controller 1255 manages resources for transmission of the SR control information of UE. When UE simultaneously transmits SR control information and uplink control information or data, the SR controller 1255 controls the operations related to the UE's operations. The SR controller 1255 transmits related information to the scheduler, the components in the transmitter and receiver, and eNB2. The PDCCH block 1205 performs processes such as channel coding, modulation, etc. for downlink control information including scheduling information, etc., under the control of the SR controller 1255 and the scheduler 1250, to create Physical Downlink Control Channel (PDCCH). The PDSCH block 1210 performs processes such as channel coding, modulation, etc. for downlink data, under the control of the scheduler 1250, to create Physical Downlink Shared Channel (PDSCH). The PDCCH and PDSCH, created in the PDCCH block and PDSCH block respectively, are multiplexed by the multiplexer 1215, processed to signals in the TX RF block 1220, and then transmitted to UE. The information, such as resources for transmission of the SR control information, etc. is transmitted to UE via PDSCH.

The receiver of the eNB1 demultiplexes signals transmitted from UE to transfer the demultiplexed signals to the PUCCH block and PUSCH block. The PUCCH block performs processes such as demodulation, channel decoding, etc. for Physical Uplink Control Channel (PUCCH) including uplink control information of UE to obtain the SR control information, HARQ ACK/NACK, CSI, etc. The PUSCH block processes such as demodulation, channel decoding, etc. for Physical Uplink Shared Channel (PUSCH) including uplink data of UE to obtain uplink data transmitted from the UE. The PRACH block performs processes such as demodulation, etc., for a random access preamble transmitted from the UE and performs the operations corresponding to the random access procedure of the UE. The receiver of eNB1 applies the results output from the PUCCH block, PUSCH block, and PRACH block to the scheduler 1250 and SR controller 1255 to use the results in the scheduling process.

The control unit of the eNB1 according to an embodiment is capable of transmitting SR information transmission-related information to UE and receiving the SR information from the UE. The control unit is capable of creating scheduling control information in response to the SR information, and transmitting the created scheduling control information to the UE via the downlink frequency of the eNB or downlink frequencies of the rest of the carrier-aggregated eNBs.

Figure 13:
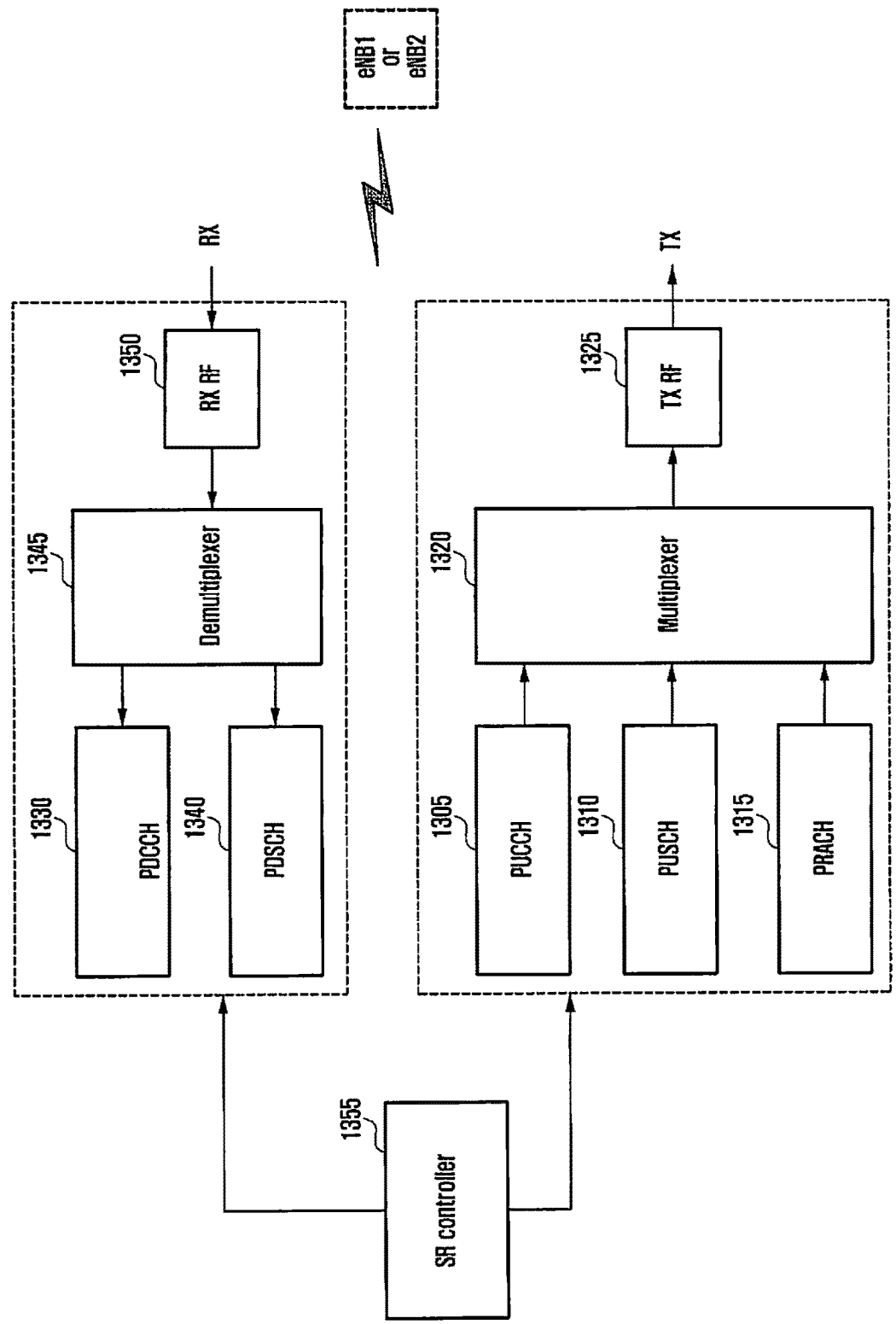
FIG. 13 is a schematic block diagram showing UE according to an embodiment of the present invention.

FIG. 13 is a schematic block diagram showing UE according to an embodiment of the present invention. Referring to FIG. 13, the UE includes a transmitter, a receiver, and a scheduling request (SR) controller 1355. The transmitter includes a PUCCH block 1305, PUSCH block 1310, PRACH block 1315, multiplexer 1320, and transmission RF (TX RF) block 1325. The receiver includes a PDCCH block 1330, PDSCH block 1340, demultiplexer 1345 and reception RF (RX RF) block 1350. In the embodiment, the SR controller 1355 may also be called a control unit. The SR controller controls the components in the receiver and transmitter and the SR operation of the UE, according to control information transmitted from the eNB.

The PDCCH block 1330 of the receiver performs processes such as demodulation, channel decoding, etc. for PDCCH received by the UE to obtain downlink control information. The PDSCH block 1340 performs processes such as demodulation, channel decoding, etc. for PDSCH received by the UE to obtain downlink data. The PUCCH block 1305 of the transmitter performs processes such as channel coding, demodulation, etc. for the uplink control information including the SR control information, HARQ ACK/NACK, CSI, etc. to create PUCCH. The PUSCH block 1310 performs processes such as channel coding, demodulation, etc. for the uplink data to create PUSCH. The PRACH block 1315 configures a random access preamble that the UE will transmit.

The PUCCH, PUSCH and random access preamble, created in the PUCCH block, and PUSCH block and PRACH block respectively, are multiplexed by the multiplexer 1320, processed to signals in the TX RF block 1325, and then transmitted to eNB1 or eNB2.

The control unit according to an embodiment of the present invention receives the SR transmission-related information from an eNB. In order to transmit uplink data, the control unit determines a destination eNB to transmit the SR information, based on a preset standard and transmits the SR information to the destination eNB.

In this case, the control unit is capable of determining the destination eNB considering at least one of the following: a type of data to be transmitted, a channel state between UE and each of the eNBs, a power headroom indicating available power by UE, and a condition as to whether a cell-configuring carrier aggregation is activated. The control unit is also capable of transmitting the SR information to the eNB, based on the uplink frequency of the destination eNB and the received, SR transmission-related information.

The control unit according to an embodiment of the present invention is capable of transmitting SR information and then making an attempt to receive the scheduling control information via the downlink frequency corresponding to the destination eNB for a preset period of time. When the control unit does not receive the scheduling control information within the period of time, it is capable of performing random access to the destination eNB.

The control unit according to another embodiment of the present invention is capable of transmitting the SR information and then making an attempt to receive the scheduling control information via the downlink frequency corresponding to the destination eNB for a preset period of time. When the control unit does not receive the scheduling control information within the period of time, it is capable of transmitting the SR information to the other carrier-aggregated eNBs, other than the destination eNB.

The control unit is capable of transmitting the SR information, and then making an attempt to receive scheduling control information via the downlink frequencies that respectively correspond to two or more carrier-aggregated eNBs, for a preset period of time.

The control unit is capable of receiving, from the eNB, information indicating whether the eNB transmits scheduling control information via only the downlink frequency corresponding to the eNB or via a downlink frequency corresponding to one of the two or more carrier-aggregated eNBs, in response to the reception of the SR information.

As described above, the present invention defines a procedure and method for requesting scheduling in the wireless communication system, thereby enabling the terminal (user equipment) to efficiently transmit uplink data.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method for a terminal to transmit a scheduling request (SR) in a wireless communication system that supports carrier aggregation between a first base station and a second base station, comprising:
   receiving information on transmission of the SR from the first base station and the second base station;
   determining a destination base station to transmit the SR among the first base station and the second base station, based on at least one of a channel state between the terminal and each base station of the at least two or more base stations, a power headroom indicating available power by the terminal or a condition as to whether a cell-configuring carrier aggregation is activated, if a transmission of an uplink data is needed;
   transmitting the SR to the first base station based on the information on transmission of the SR, if the destination base station is determined to be first base station; and
   receiving scheduling control information from the second base station in response to transfer of the SR from the first base station to the second base station.

2. The method of claim 1, wherein transmitting the SR to the first base station comprises:
   transmitting the SR to the first base station, based on an uplink frequency of the first base station.

3. The method of claim 2, further comprising:
   after transmitting the SR, determining whether the scheduling control information is received on a downlink frequency corresponding to the second base station for a preset period of time; and
   if the scheduling control information has not been received within the period of time, performing random access to the second base station.

4. The method of claim 2, further comprising:
   after transmitting the SR, determining whether the scheduling control information is received on a downlink frequency corresponding to the second base station for a preset period of time; and
   if the scheduling control information has not been received within the period of time, transmitting the SR to the first base station.

5. The method of claim 1, further comprising:
   after transmitting the SR, determining whether scheduling control information is received on downlink frequencies that respectively correspond to the first base station and the second base station, for a preset period of time.

6. The method of claim 1, further comprising:
   receiving, from the second base station, information indicating whether the scheduling control information is transmitted on a downlink frequency corresponding to the second base station or on downlink frequencies corresponding to the first base station and the second base station.

7. The method of claim 1, wherein receiving the scheduling control information comprises:
   receiving, information for receiving the scheduling control information, when a backhaul delay between the first base station and the second base station is lower than a preset threshold; and
   receiving, the scheduling control information based on the information for receiving the scheduling control information from the second base station, when the SR has transmitted from the first base station and the second base station.

8. A method for a terminal to transmit a scheduling request (SR) in a wireless communication system that supports carrier aggregation between a first base station and a second base station, comprising:
   receiving information on resources for transmission of SR from the first base station and the second base station;
   determining a destination base station to transmit the SR among the first base station and the second base station, based on at least one of a channel state between the terminal and each base station of the at least two or more base stations, a power headroom indicating available power by the terminal or a condition as to whether a cell-configuring carrier aggregation is activated, if a transmission of an uplink data is needed;
   transmitting the SR to the first base station, on the resources corresponding to the first base station, if the destination base station is determined to be the first base station; and
   receiving scheduling control information from the second base station in response to transfer of the SR from the first base station to the second base station.

9. The method of claim 8, wherein the first base station and the second base station use the same uplink frequency and the same downlink frequency.

10. The method of claim 8, wherein the information on resources for transmission of SR includes at least one of the following:
   a transmission period of the SR, a timing offset within the transmission period of the SR, and a resource index of the SR.

11. The method of claim 8, wherein receiving the scheduling control information comprises:
   receiving, information for receiving the scheduling control information, when a backhaul delay between the first base station and the second base station is lower than a preset threshold; and
   receiving, the scheduling control information based on the information for receiving the scheduling control information from the second base station, when the SR has transmitted from the first base station to the second base station.

12. A method for a first base station to transmit scheduling control information in a wireless communication system that supports carrier aggregation between the first base station and a second base station, comprising:
   transmitting information on transmission of a scheduling request (SR) to a terminal;
   receiving the SR determined based on the information on transmission of the SR from the terminal; and
   transmitting the SR to the second base station based on information between the first base station and the second base station.

13. The method of claim 12, wherein transmitting the SR comprises:
   identifying a backhaul delay between the first base station and the second base station; and
   transmitting the SR to the second base station for transmitting scheduling control information in response to the SR, when the backhaul delay is lower than a preset threshold.

14. A terminal for transmitting a scheduling request (SR) in a wireless communication system that supports carrier aggregation between a first base station and a second base station, comprising:
   a transceiver configured to transmit/receive signals to/from the first base station and the second base station; and
   a controller configured to:
      control the transceiver to receive; information on transmission of SR, from the first base station and the second base station;
      determine a destination base station to transmit the SR among the first base station and the second base station based on at least one of a channel state between the terminal and each base station, a power headroom indicating available power by the terminal or a condition as to whether a cell-configuring carrier aggregation is activated, if a transmission of an uplink data is needed;
      control the transceiver to transmit the SR to the first base station based on the information on transmission of SR, if the destination base station is determined to be the first base station; and
      control the transceiver to receive scheduling control information from the second base station in response to the transfer of the SR from the first base station to the second base station.

15. The terminal of claim 14, wherein the controller is further configured to transmit the SR to the first base station based on an uplink frequency of the first base station.

16. The terminal of claim 15, wherein the controller is further configured to determine, after transmitting the SR, whether the scheduling control information is received on a downlink frequency corresponding to the second base station for a preset period of time; and
   perform, if the scheduling control information has not been received within the period of time, random access to the second base station.

17. The terminal of claim 15, wherein the controller is further configured to determine, after transmitting the SR information, whether the scheduling control information is received on a downlink frequency corresponding to the second base station for a preset period of time; and
   control the transmitter to transmit, if the scheduling control information has not been received within the period of time, the SR to the first base station.

18. The terminal of claim 14, wherein the controller is further configured to determine, after transmitting the SR, whether scheduling control information is received on downlink frequencies that respectively correspond to the first base station and the second base station, for a preset period of time.

19. The terminal of claim 14, wherein the controller is further configured to control the transceiver to receive, from the second base station, information indicating whether the scheduling control information is transmitted on a downlink frequency corresponding to the second base station or on downlink frequencies corresponding to the first base station and the second base station.

20. The terminal of claim 14, wherein the controller is further configured to:
   control the transceiver to receive information for receiving the scheduling control information, when a backhaul delay between the first base station and the second base station is lower than a preset threshold; and
   control the transceiver to receive, the scheduling control information based on the information for receiving the scheduling control information from the second base station, when the SR has transmitted from the first base station to the second base station.

21. A first base station for transmitting scheduling control information in a wireless communication system that supports carrier aggregation between the first base station and a second base station, comprising:
   a transceiver configured to transmit/receive signals to a terminal or the second base station;
   a controller configured to:
      control the transceiver to transmit information on transmission of a scheduling request (SR) to the terminal;
      control the transceiver to receive, SR determined based on the information on transmission of the SR, from the terminal;
      control the transceiver to transmit, the SR based on information between the first base station and the second base station, to the second base station.

22. The first base station of claim 21, wherein the controller is further configured to:
   identify a backhaul delay between the first base station and the second base station; and
   control the transceiver to transmit the SR to the second base station for transmitting scheduling control information in response to the SR, when the backhaul delay is lower than a reset threshold.

* * * * *